(12) United States Patent
Ballantyne

(10) Patent No.: US 7,472,393 B2
(45) Date of Patent: *Dec. 30, 2008

(54) METHOD AND SYSTEM FOR REAL TIME SCHEDULER

(75) Inventor: Joseph C. Ballantyne, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 624 days.

This patent is subject to a terminal disclaimer.

(21) Appl. No.: 11/129,309

(22) Filed: May 16, 2005

(65) Prior Publication Data

US 2005/0229179 A1 Oct. 13, 2005

Related U.S. Application Data

(63) Continuation of application No. 09/961,649, filed on Sep. 24, 2001, now Pat. No. 6,957,432, which is a continuation-in-part of application No. 09/531,397, filed on Mar. 21, 2000, now Pat. No. 6,990,669.

(60) Provisional application No. 60/234,965, filed on Sep. 23, 2000.

(51) Int. Cl.
*G06F 9/46* (2006.01)

(52) U.S. Cl. .................. 718/108; 718/100; 718/102; 718/107

(58) Field of Classification Search .............. 718/1, 718/100–108; 703/23–26; 710/200, 260; 709/100, 102, 103, 107; 719/321, 236, 329; 713/502

See application file for complete search history.

(56) References Cited

U.S. PATENT DOCUMENTS

| 5,437,047 | A | 7/1995 | Nakamura | |
|---|---|---|---|---|
| 5,995,745 | A | 11/1999 | Yodaiken | |
| 6,167,425 | A * | 12/2000 | Beckhoff | 718/103 |
| 6,330,583 | B1 | 12/2001 | Reiffin | |
| 6,470,397 | B1 * | 10/2002 | Shah et al. | 709/250 |
| 6,754,690 | B2 | 6/2004 | Larson | |

OTHER PUBLICATIONS

Adelberg, et al., *Emulating Soft Real-Time Scheduling Using Traditional Operating System Schedulers*, Proceedings Real-Time Systems Symposium 1994, pp. 292-298.

Ecker, *Solving Hard Real-Time Scheduling Problems on a Single Processor*, Proceedings of the 4th International Workshop on Parallel and Distributed Real-Time Systems 1996, pp. 81-86.

(Continued)

*Primary Examiner*—William H Wood

(57) ABSTRACT

Methods and computer-executable components for real-time scheduling of CPU resources are disclosed. A performance counter determines when to allocate CPU resources to a thread. When it is time to allocate the CPU resources, the performance counter issues a maskable or non-maskable interrupt to an advanced programmable interrupt controller (APIC). The APIC then issues a maskable non-maskable interrupt to the CPU. In response to receiving the non-maskable interrupt, the CPU allocates resources to the thread. In addition, the disclosed methods and computer-executable components also: (a) allow scheduling of CPU resources such that real-time threads are guaranteed respective portions of time slots, (b) enable real-time scheduling on a non-real-time operating system, and (c) provide scheduling of CPU resources on a uni-processor machine such that at least first and second real-time threads dependent on one another are synchronized.

18 Claims, 8 Drawing Sheets

OTHER PUBLICATIONS

Jeffay, et al., *Proportional Share Scheduling of Operating System Services for Real-Time Applications*, Proceedings of the 19th IEEE Real-Time Systems Symposium, 1998, pp. 480-491.

Ingram, *Soft Real Time Scheduling for General Purpose Client—Server Systems*, Proceedings of the Seventh Workshop on Hot Topics in Operating Systems 1999, pp. 130-135.

Wang and Lin, *Implementing a General Real-Time Scheduling Framework in the RED-Linux Real-Time Kernel*, Proceedings of the 20th IEEE Real-Time Systems Symposium 1999, pp. 246-248.

Lin et al., *A Sort Real-Time Scheduling Server on the Windows NT*, Proceedings of the 2nd USENIX Windows NT Symposium, 1998, pp. 149-155.

Peterson & Schotland, *Win32 and Real Time*, Circuit Cellar Ink, Apr. 1999, pp. 45-49.

Chu and Nahrstedt, *A Soft Real Time Scheduling Server in UNIX Operating System*, Interactive Distributed Multimedia Systems and Telecommunication Services, 4th International Workshop, 1997, pp. 153-162.

* cited by examiner

METHOD AND SYSTEM FOR REAL TIME SCHEDULER

This application is a continuation of U.S. application Ser. No. 09/961,649, which was filed Sep. 24, 2001, and claims priority to provisional U.S. Application Ser. No. 60/234,965, which was filed on Sep. 23, 2000. This application also claims priority to non-provisional U.S. application Ser. No. 09/531,397, which was filed on Mar. 21, 2000. These applications are incorporated herein by reference in their entirety.

BACKGROUND OF THE INVENTION

1. Field of the Invention

The present invention relates to the field of computer operating systems and, in particular, to methods and computer-executable components for facilitating real-time scheduling of CPU resources.

2. Description of Related Art

Microsoft Windows NT® and Windows® 95/98/98SE/ME do not currently support real-time scheduling of CPU resources. For example, with Windows NT®, all interrupts and deferred procedure calls must be completed before execution of a "real-time" priority NT thread. Even more problematic is the fact that third-party virtual device drivers can disable all interrupts in Windows® 9x (95/98/98SE/ME). Further, thread execution on these operating systems is scheduled based on the idea of a thread priority. Threads of equal priority split the CPU resources equally. The highest priority thread that can be run is always the thread that is chosen to run. This means that a thread will never run if there is always a higher priority thread available to run. (ie: is not blocked on some synchronization object) There is no concept of allocating a percentage of CPU resources to a thread on a periodic or single-shot basis. In addition, there is no up-front failure if the required CPU resources are not available because other clients have already reserved the needed CPU bandwidth. Consequently, even the highest priority threads can have their execution delayed for indeterminate periods of time in both operating systems due to the execution of other threads of the same priority as well as the execution of interrupts and DPCs that are not bound in the length of time they may take to complete.

The Windows NT® driver model allows execution in 3 different fundamental layers of the OS, at interrupt time, at DPC time, and at thread execution time. Interrupts are run before anything else. If there is an interrupt pending, and it can be serviced, then servicing it will happen before anything else. After all hardware interrupts are serviced, any pending deferred procedure calls (DPCs) are executed. These DPCs are run in a software interrupt. The DPCs can be interrupted by other interrupts that have a higher priority, but they will all be run before execution of the interrupted thread resumes. After all interrupts have been serviced, and all queued DPCs have been run, then the operating system resumes running a thread. All application level code is run in a thread. Most of the operating system code also runs in threads at a passive interrupt request level (irql).

Well-written Windows NT® drivers spend very little time in their interrupt service routine (ISR). Windows NT® device drivers are supposed to do most of their work in a DPC or in a thread. Thus, well-written drivers do little more in their ISR besides touch their hardware to clear the interrupt, and queue up a DPC in which they will do most of their work. The vast majority of Windows NT® drivers are well behaved so interrupt latency on Windows NT® is very low, usually on the order of tens of nanoseconds to microseconds. A DPC can run on any processor and in any thread context. On a uni-processor system all DPCs must complete before the system will return to running the thread whose execution was interrupted. On a multiple processor machine, it is possible to have one processor running a thread while a different processor is servicing an interrupt, or running a DPC.

There are two primary obstacles to guaranteed, hard periodic scheduling of threads on Windows NT®. First, there is no API defined to specify to the operating system what periodicity and CPU resources a thread requires. Second, interrupts and DPCs hold off execution of all threads, and the length of time those interrupts and DPCs can run is unbounded.

On Microsoft Windows® 95, 98, 98SE, and ME the situation is worse. There are a significant number of poorly-written third-party device drivers (i.e., VxDs) that disable all interrupts on the operating system. Sometimes, these device drivers will disable interrupts for extended periods of time. When interrupts are disabled nothing else in the system can run except the code that turned off interrupts. On Windows NT® it is considered unacceptable to turn off all interrupts. There are very few places in the Windows NT® kernel where all interrupts are turned off. However, on Windows® 95 originally, the only way to disable one interrupt was to disable them all. There was no concept in that operating system of multiple interrupt request levels (IRQL). Interrupts were either enabled, or disabled, and the only priority relationships between interrupts were those imposed by the programmable interrupt controller (PIC) at the hardware level. In the software, all interrupts were treated equally. In fact, the kernel interrupt service code actually muddled the priority relationships between interrupts that were imposed at the hardware level. Since it made it possible for a lower priority interrupt at the hardware level to interrupt code that serviced hardware with an interrupt at a higher priority level if the interrupt service routine for the higher priority interrupt enabled interrupts.

This situation changed somewhat with Windows® 98 when the Windows Driver Model (WDM) support was added to the operating system. At least for WDM drivers, there was now the concept of IRQL and interrupt priority levels in the software. However, all of the legacy third-party device drivers continue to run the same way they previously operated. All of the legacy kernel system code still deals with interrupts as either ON or OFF. Consequently, even in Windows® 98, 98SE, ME there is lots of code in the operating system and in third-party device drivers that disables interrupts.

In order to perform any real-time scheduling on Windows® 9x, something must be done to solve the problem of how to get control from the existing code when interrupts are disabled. The assembly language instruction for turning off maskable interrupts is CLI. To re-enable interrupts the instruction is STI. Interrupts can also be enabled in ring 0 code by popping the EFLAGS register off of the stack. There are CLIs, STIs, and PUSHFD, POPFD instructions all through the Windows® 9x code base. Unless control of the CPU can be taken away from code that is running with interrupts disabled, there is no hope of enabling guaranteed hard real-time scheduling. Scheduled threads will not be allowed to run until after the STI instruction is executed.

Accordingly, it is an object of the present invention to provide improved methods and computer-executable components for facilitating real-time scheduling of CPU resources.

BRIEF SUMMARY OF THE INVENTION

The present invention overcomes some limitations of the prior art by providing methods and computer-executable components for performing real-time scheduling and for synchronizing execution of real-time threads with each other and other non real-time threads.

In one embodiment, a method facilitates real-time scheduling of CPU resources on a microprocessor. A counter (such as a performance counter, timer or other device) is used to determine when to switch CPU resources to a thread. When it is time to allocate the CPU resources, the counter generates an interrupt, which is fed to an interrupt controller, such as an advanced programmable interrupt controller (APIC). The interrupt controller then causes the CPU to execute the appropriate interrupt handler, which switches the CPU resources to the thread. Preferably, the interrupt used to gain control from the non real-time operating system is a maskable interrupt, while the interrupt used to switch between real-time threads is non-maskable.

In another embodiment, the counter interrupt line could be directly connected to the CPU rather than going through the APIC first. The counter would, in this example, issue a non-maskable interrupt directly to the CPU.

In a further embodiment, the present invention allows a CPU, which is running a non-real-time operating system, to also perform real-time scheduling of CPU resources. In this embodiment, the present invention treats the execution of non real-time operating system as a single real-time thread. The invention allocates a certain guaranteed percentage of the CPU to the thread running the non real-time operating system, and in addition gives all unallocated or unused time to that thread as well. This allows the non real-time operating system to run as fast as it did previously when there are no other real-time threads running. When there are other real-time threads running, the speed of execution of the operating system slows by the percentage of time actually used by the other real-time threads. The smallest period of time that the real-time scheduler will time slice is called a time-slot. The invention executes each real-time thread running on the CPU for its corresponding portion of the time slot. When the portion of time corresponding to one thread expires, the next real-time thread is executed until its portion of time expires. This is a round-robin scheduling algorithm that executes every runnable real-time thread every timeslot. Other scheduling algorithms are possible—such as earliest deadline first—which require fewer overall thread switches.

In still another embodiment, the present invention guarantees that each real-time thread will be executed (i.e. allocated CPU resources) for its respective portion of the time slot. Preferably, this is accomplished by instructing an APIC to issue a maskable or non-maskable interrupt to the CPU. The APIC will issue a local timer interrupt to the CPU whenever the time slot (i.e. the period of time during which each real-time thread is guaranteed to execute at least once) for the CPU begins. Whenever a thread's portion of the CPU is expired, a performance counter preferably issues either a maskable or non-maskable interrupt in order to switch execution to the next real-time thread. In the current embodiment, the performance counter interrupts are non maskable—thus interrupts can stay disabled the whole time that real-time threads are being run, and when control is switched back to the Windows real-time thread, the interrupt flag is restored to the state it had when control was taken from Windows.

In still a further embodiment, the present invention enables scheduling of CPU resources such that real-time threads (which are dependent on data from one another) are synchronized. In this embodiment, the present invention defines a time slot for which said CPU resources are to be allocated. Portions of the time slot to be allocated to real-time threads are preferably determined either by allowing each thread to request a portion of the time slot or by dynamically assigning portions based on historical use. For each real-time thread that is not blocked on a synchronization object (in this embodiment, the synchronization objects are spinlocks), the thread is executed until its portion of the time slot expires or the thread tries to acquire a synchronization object owned by another real-time thread (in which case it blocks), whichever comes first. If the thread is blocked on a synchronization object, the scheduler gives its allocated CPU resources to the thread that owns the synchronization object until the owning thread releases the spinlock—at which time the scheduler continues running the thread that was blocked. Note that in the current embodiment, the only synchronization object currently supported is a spinlock. Further, since spinlocks were defined for the Windows platform, and are used by existing drivers, the current embodiment allows real-time threads to synchronize with non real-time windows threads through the use of spinlocks. The operating system spinlock implementation was modified so that spinlocks in most cases no longer do a spinwait—rather—they transfer execution to the real-time thread that owns the lock. The modified spinlock code is included as an appendix to this application.

Of course, the methods of these embodiments may also include other additional components and/or steps.

Other embodiments are disclosed and claimed herein as well.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
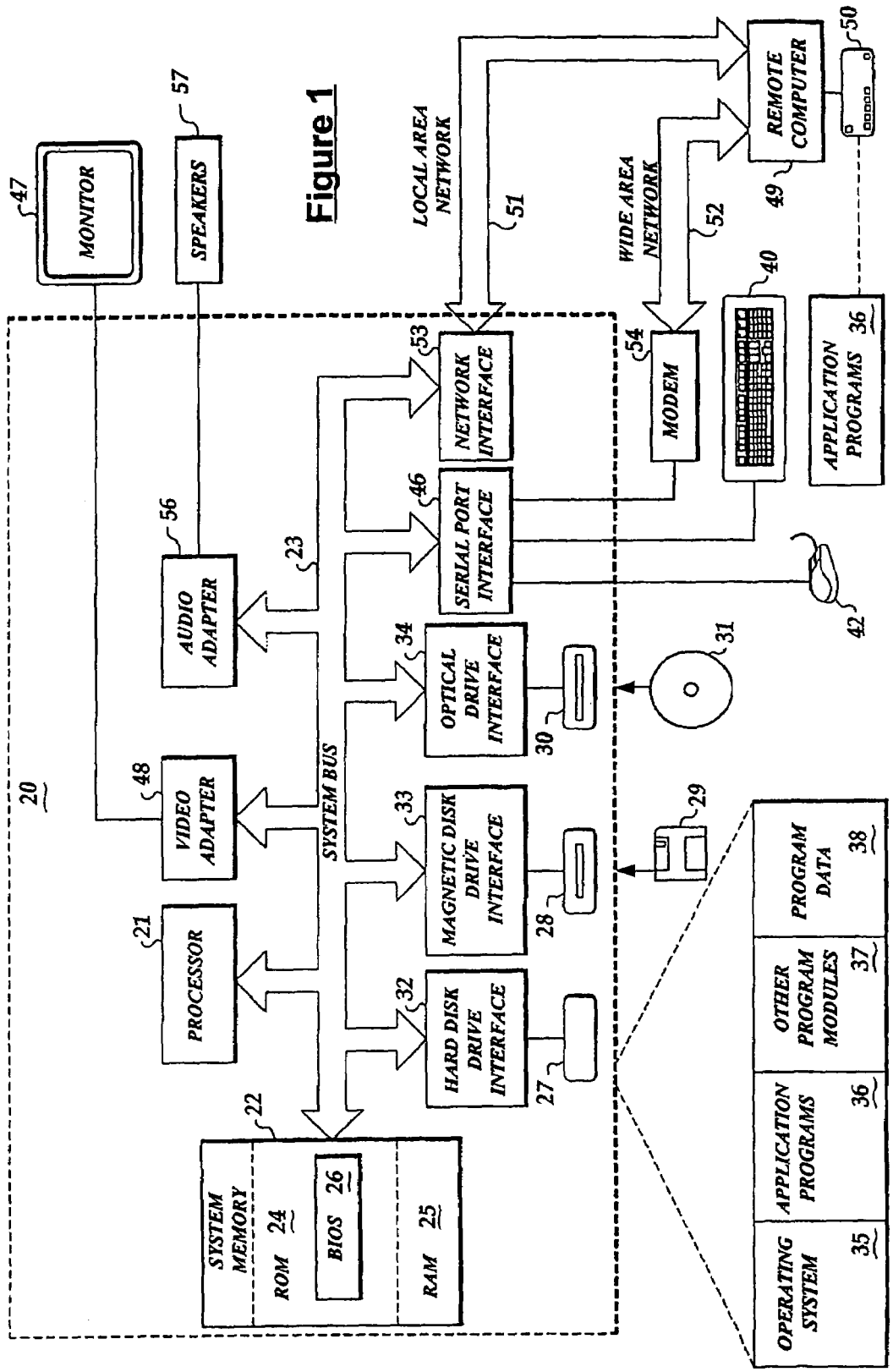
FIG. 1 is a block diagram of a general-purpose computer system capable of being used in conjunction with the present invention.

The present invention provides methods and computer-executable components for facilitating real-time scheduling of CPU resources. In particular, this invention overcomes the limitations of the prior art by preferably using a performance counter to count unhalted cycles or instructions executed on the CPU. After a determined number of cycles or instructions transpire, the performance counter issues a maskable or non-maskable interrupt to a programmable interrupt controller (PIC), such as an APIC on the Intel x86 CPU or the AMD Athlon and Duron (K7) CPU. Issuance of the MI or NMI triggers execution of the scheduler, and thus, switches thread execution on a real-time basis. In addition, the disclosed methods and computer-executable components also: (a) allow scheduling of CPU resources such that real-time threads are guaranteed respective portions of time slots, (b) enable real-time scheduling on a non-real-time operating system, and (c) provides synchronization methods that can be used to synchronize between real-time and non real-time threads. Thus, this invention overcomes the problems of the prior art and provides real-time scheduling of CPU resources and synchronization of real-time threads.

Before proceeding with a detailed discussion of this case, the following terms are defined in order to facilitate a better understanding of the present invention.

"Advanced configuration and power interface" (ACPI) is a power management specification that makes hardware status information available to the operating system. ACPI enables a PC to turn its peripherals on and off for improved power management especially in portables. It also allows the PC to be turned on and off by external devices, so that the touch of a mouse or the press of a key will "wake up" the machine.

An "advanced programmable interrupt controller" (APIC) is interrupt handling hardware that can support symmetric multiprocessing (SMP) for Intel multiprocessor systems. In multiprocessor systems there are both local APICs that reside on each CPU, and an IO APIC that communicates with the local APICs on each CPU. All Intel processors from the Pentium MMX (P54C) on up have a local APIC. The Pentium II and newer processors can enable and disable the local APIC under software control. The Pentium MMX local APIC was enabled and disabled according to voltage levels sampled on certain pins of the processor when the processor came out of reset. That means the Pentium local APIC cannot be enabled if the system designer turned it off in hardware. Most Pentium systems disable the local APIC.

An "application program interface" (API) is a set of well-defined function calls that can be made by one software module to another software module. In many cases this takes the form of an application program calling functions in the operating system or other system program such as a database management system (DBMS). APIs are implemented by writing functions in one software module in a fashion that enables calls to those functions from external modules to be linked to the module containing the function.

A "central processing unit" (CPU) as used herein is the computing portion of a processor or microprocessor. Examples of such processors are the Intel Pentium 4GB, Pentium MMX 4GB, Pentium Pro 64GB, Pentium II 4GB MMX, Celeron 4GB MMX, Xeon PII 64GB MMX, Pentium III 4GB MMX KNI, or Xeon PIII 64GB MMX KNI. Other suitable processors are also available from Digital Equipment Corporation, Advanced Micro Devices, and Cyrix Corporation.

A "counter" is a variable in programming, a hardware chip or a portion thereof, that is used to keep track of anything that must be counted.

A "driver," also called a "device driver," is a program routine that links a peripheral device to the operating system. A driver contains the precise machine language necessary to perform the functions requested by the application or the operating system.

A "global descriptor table" (GDT) is a table used by the operating system to identify the descriptors for shared data.

An "interrupt descriptor table" (IDT), or an "interrupt dispatch table" is a table used by the operating system to identify software interrupt handlers or interrupt service routines for each of the supported interrupts in the system. In the event that an interrupt is received or an interrupt instruction is executed by the CPU, the CPU will look up the appropriate address for the handler for that interrupt and then transfer control to that handler.

An "interrupt request line" (IRQ) is a hardware interrupt line or trace on a PC. AT compatible PCs support 16 hardware interrupts. One of these is used to support a cascaded interrupt controller, so there are 15 external interrupt sources that can be supported on the PC AT compatible system. Machines with APICs can support additional hardware interrupts up to 256 which is the maximum size of the x86 IDT. Most non PCI devices do not share interrupts. PCI devices can and many times do share interrupts.

An "interrupt service routine" (ISR) is a program routine executed in response to an interrupt. The IDT contains pointers to the entry points of the interrupt service routines.

An "interrupt" is a signal that gets the attention of the CPU and is usually generated when I/O is required. For example, hardware interrupts are generated when a key is pressed or when the mouse is moved. Disk drive's will generate interrupts when they have completed a read or write and are ready for the next command. When an interrupt occurs, control is transferred to the operating system, which determines the action to be taken. Interrupts are prioritized; the higher the priority, the faster the interrupt will be serviced.

A "machine cycle" is the shortest interval in which an elementary operation can take place within the processor. It is made up of some number of clock cycles. On current processors many instructions run in one clock cycle—thus one machine cycle is one clock cycle.

A "maskable interrupt" (MI) is an interrupt on the processor that can be masked or unmasked by software running on the processor. When an interrupt is masked, it is ignored by the processor until software unmasks it.

"Multitasking" is the running of two or more programs in one computer at the same time. The number of programs that can be effectively multitasked depends on the type of multitasking performed (preemptive vs cooperative), CPU speed and memory and disk capacity.

"Multithreading" is multitasking within a single program. It allows multiple streams of execution to take place concurrently within the same program, each stream processing a different transaction or message.

A "non-maskable interrupt" (NMI) is an interrupt on the processor that cannot be masked by software. When this type of interrupt is made active, the interrupt will be serviced. Software cannot mask or force the processor to ignore this interrupt. True non-maskable interrupts do not exist on the PC platform today. There is a way to mask even "non-maskable interrupts"—but you must do additional work to that involved in masking maskable interrupts. Maskable interrupts can be disabled on an x86 processor by simply executing the CLI instruction. Maskable interrupts can be enabled on an x86 processor by executing the STI instruction. Executing a CLI instruction or clearing the IE bit of the EFLAGS register will NOT prevent a "non-maskable interrupt" from occurring. Normally a non-maskable interrupt (NMI) is used to report malfunctions such as parity, bus and math coprocessor errors. In the present invention, an NMI can be used to instruct the CPU to switch execution from one thread to another.

An "operating system" is the master control program that runs a computer. The operating system is loaded when the computer is turned on, and its core, called the kernel, is at least partly resident in memory at all times. Operating systems, as the term is used herein, includes but is not limited to: Microsoft Windows® 95, 98, 98SE, ME, Microsoft Windows NT®, UNIX, Linux and Macintosh System 7.

An "OPEN programmable interrupt controller" (Open-PIC) is an SMP chip architecture endorsed by AMD and Cyrix Corporation that provides symmetric multiprocessing (SMP) for x86 and PowerPC systems.

A "programmable interrupt controller" is an Intel 8259A chip that controls interrupts or any other chip capable of controlling interrupts. Starting with the 286-based AT, there are two PICs in a PC, providing a total of 15 usable IRQs. The PIC has been superseded by Advanced Programmable Interrupt Controllers or APICs, which are enhanced for multiprocessing.

A "scheduler" is a part of the kernel or a device driver in an operating system that initiates and terminates processes (programs or applications) and threads. In addition, a scheduler periodically decides which thread should be run next and switches control to that thread.

A "scheduling algorithm" is a method used to schedule jobs for execution. Priority, length of time in the job queue, least recently used, and available resources are examples of criteria that can be used in a scheduling algorithm.

A "thread" is the state that must be maintained by a scheduler in order to allow multiple paths of execution through a piece of code, or in order to allow the CPU(s) to be shared between multiple running programs.

A "time slot" is a periodic amount of time during which a CPU can execute instructions. The time slot can be any amount of time such as, for example, 1 ms. In this invention, a time slot is the smallest period which the scheduler will allow a real time thread to specify as its period. The real-time scheduler schedules each real-time thread to run once during every time-slot. The fraction of the time-slot for which each thread runs corresponds to the amount of time reserved for that thread when the thread was created.

A "virtual device driver" (VxD) is a special type of Windows® driver that allows Windows® to perform functions that cannot be done by applications communicating with Windows in the normal manner. VxDs run at the most privileged CPU mode (ring 0) and allow low-level interaction with the hardware and internal Windows® functions, such as memory management. Consequently, poorly-written VxDs can cause the operating system to crash.

The "Windows driver model" (WDM) is a device driver architecture from Microsoft that is a subset of the Windows NT® driver model. WDM enables a single driver to run on both Windows® 98 and Windows NT®. Hardware vendors can use WDM to write one driver for their hardware that will work on both operating systems.

Now therefore, in accordance with the present invention, an operating system executes on a computer, such as a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules or components 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

Figure 2:
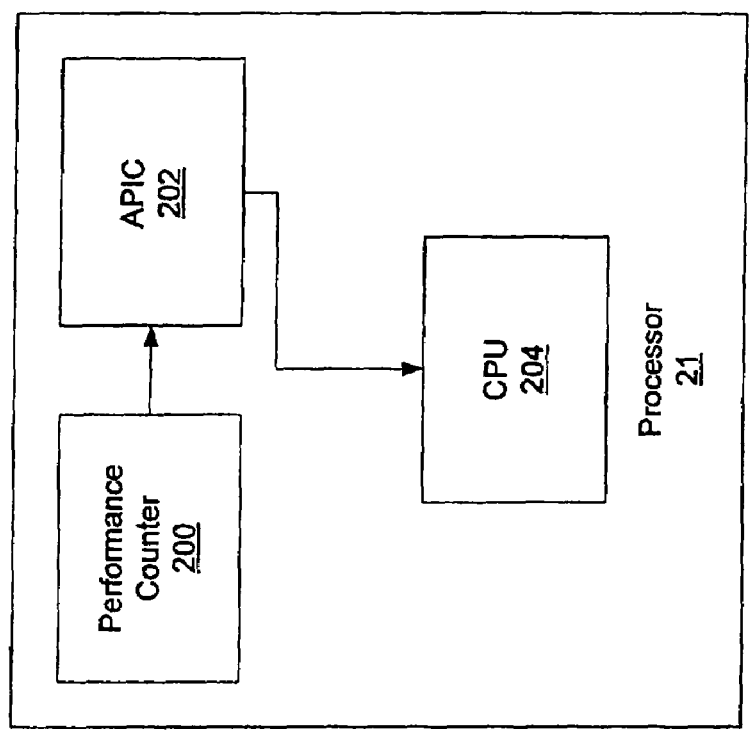
FIG. 2 is a block diagram of the performance counter, APIC and CPU located within the microprocessor of FIG. 1.

The personal computer 20 may operate in a networked environment using logical connections to one or more remote computers, such as remote computer 49 or any of the computers shown in FIG. 2. Each remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 49 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The next figure, FIG. 2, provides a partial overview of an exemplary processor 21 capable of being used in conjunction with the present invention. Preferably, processor 21 is one of the following chips available from Intel Corporation: the Pentium II 4GB MMX, Pentium III 4GB MMX KNI, Celeron 4GB MMX, Xeon PII 64GB MMX, or Xeon PIII 64GB MMX KNI. In addition, the AMD Athlon and Duron processors which are based on the K7 processor architecture will also work with the present invention, as will the Intel P4 processors. As shown in FIG. 2, the processor 21 preferably includes at least one local performance counter 200 and at least one local APIC 202. It should be noted that the performance counter 200 could be any type of programmable or re-settable counter that counted any type of instruction (e.g., halted, unhalted, etc.) or cycle (e.g., clock cycle, machine cycle, etc.). Similarly, the performance counter 200 could simply be any type of programmable or re-settable timer, or any other type of device capable of determining when to allocate CPU resources. It should also be noted that the APIC 202 could be any type of interrupt controller, such as a PIC, a traditional APIC, an APIC embedded within the processor (as shown) or an OpenPIC.

Further, the performance counter 200 and APIC 202 need not be local or located within the processor 21. However, using a performance counter 200 and an APIC 202 locally located within the processor 21 will decrease the distance between the performance counter 200, APIC 202 and CPU 204. This will reduce the signal propagation delay and thus, will improve the performance and timing characteristics of the present invention. Consequently, the above-referenced Pentium, Pentium II, Pentium III, Pentium IV, and Athlon/Duron processors are preferable, because embedded inside the processor 21 are: a performance counter 200, an APIC 202 and a CPU 204. The basic architecture, instruction-set reference and system programming guide for these Pentium processors are publicly available and fully set forth in The Intel Architecture Software Developer's Manual, Volumes 1-3, Order Numbers 243190-92. Although inclusion of this manual is not necessary to enable a person of ordinary skill in the art to make and use this invention, the manual is nonetheless incorporated herein by reference—in its entirety—in order to provide the reader with background technical information regarding the performance counter 200, APIC 202 and CPU 204 of the preferred processor.

Figure 3:
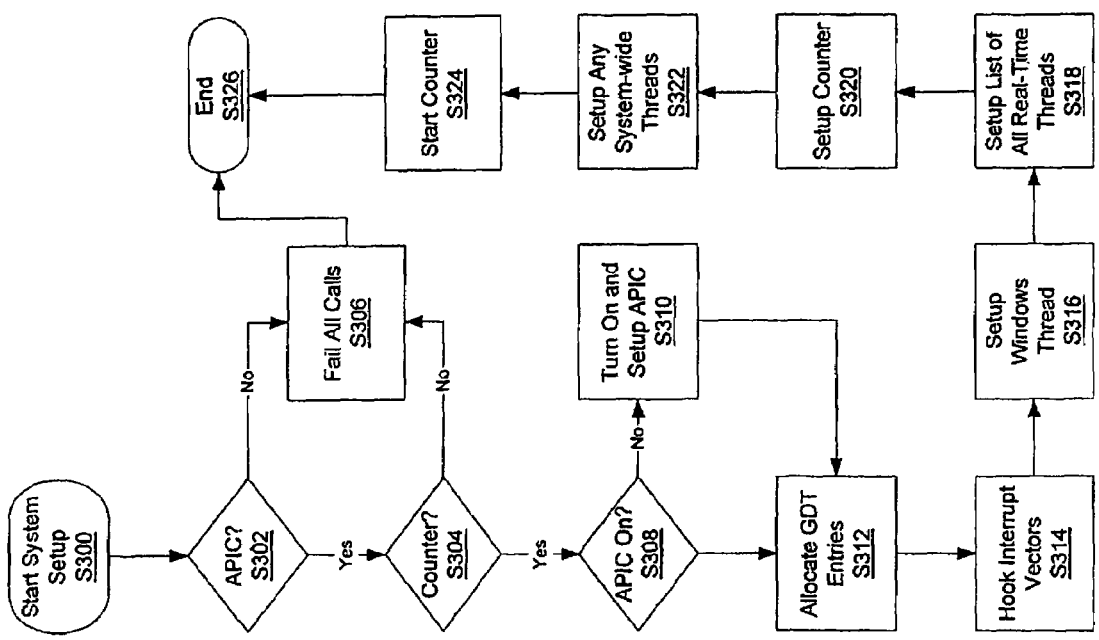
FIG. 3 is a flow chart illustrating an exemplary process of setting up the microprocessor and operating system used in the present invention.

FIG. 3 shows a flow chart of an exemplary process of setting up the processor 21 and operating system used in the present invention. The present invention is implemented as a driver that loads very early in the boot process of Windows and which exports functions some which can be used to create and destroy real-time threads. After the driver is started S300, the driver first determines whether an interrupt controller, PIC, or APIC is available and capable of being used in accordance with the present invention S302. If, for example, an APIC 202 is available—as it is with the above-referenced processors, then the driver determines whether a counter, timer or other usable device is also available S304. If an APIC S302 or a counter S304 is not available, then the driver will preferably fail all calls to it S306—irrespective of the fact that the driver stays loaded in memory.

If an APIC 202 and counter 200 are available and capable of being used S302-04, then the driver examines the local APIC to determine whether the controller is "on" S308. If the controller is not "on," then the driver will turn "on" and setup the APIC S310. As part of this setup, the APIC 202 will be preferably programmed to: (1) issue a MI to the CPU 202 every time an interrupt is received from the local APIC timer, and (2) issue an NMI to the CPU 202 every time the performance counters overflow to zero and issue an interrupt and (3) instruct the CPU 202 to look to the appropriate entry in the IDT upon receipt of a MI or NMI from the APIC 202.

After the driver determines that the APIC is "on" S308, or turns the APIC "on" and sets it up, all GDT entries for the applicable shared data are then updated S312. The applicable interrupt vectors are then "hooked" S314. In other words, the old entry in the IDT is stored, and the address for the real-time-thread-switching code is input into the entry in the IDT S314. A real-time thread is then created for the Windows® kernel or other operating system S316, an example of which is discussed below in connection with FIG. 5. Preferably, this thread only contains state information regarding the stack, processor and floating point unit. Further, except for the real-time thread created for running Windows, these threads are allowed to make only a very few specific system calls during their execution. A list of all real-time threads is then set up S318, and the real-time thread for Windows® or other operating system is added to the list.

The performance counter 200 is next set up for the first time S320. As part of this setup, the driver will program the counter 200 to issue an interrupt to the APIC 202 every time the counter rolls over (i.e., wraps to zero (0)), thereby instructing the CPU to switch execution to a new thread in accordance with the invention. The issued interrupt can be either an MI or NMI (i.e., maskable or non-maskable interrupt). In the current embodiment, the interrupt from the performance counters is always a NMI. In some situations, one type of interrupt may be preferred over another. For example, using an MI instead of an NMI will make certain APIs, which synchronize by disabling interrupts, callable from a real-time thread. However there are other issues which must be handled if the performance counter interrupt is maskable. Primarily, that interrupts will have to be enabled during the execution of real-time threads. If the execution of interrupt code is not desired during the execution of real-time threads, then some mechanism for deferring the handling of those interrupts must be implemented. Note that one way to do this is to mask the maskable interrupt pin on the processor in the local APIC. Then external maskable interrupts will not fire, and a maskable interrupt—either the local apic timer, or the performance counters, can be used to switch between real-time threads.

The performance counters 200 are normally programmed to count machine cycles. They can be optionally programmed to count other things such as unhalted cycles, executed instructions or some other event. Note that when initially setting up the performance counters, they are programmed to count cycles, but they are also disabled from counting and the interrupt they generate is masked. This is because at setup time, there is only 1 real-time thread, and that is the Windows real-time thread. Since there is only one thread, there is no need to switch between real-time threads. Hence the local apic timer interrupt which is used to take control from windows and switch to the first non Windows real-time thread is also masked. Once an additional real-time thread is created, the local apic timer interrupt will be unmasked, and then when the first real-time thread is switched to, the performance counters will be programmed and unmasked. When switching between real-time threads, one of the final steps in that process is the programming of the performance counters. The performance counters are initialized so that they will roll over or overflow to zero in the desired amount of time. If a real-time thread had allocated 10% of the CPU, and the system time-slot were 1 ms (as it is in the present embodiment), then the desired amount of time would be 100 us. The performance counters are programmed by loading the negative of the desired value into their counter. For example, if the scheduler would like the next thread to be executed 3 cycles in the future, then the counter 200 would be assigned the hexadecimal number 0xFFFFFFFD (i.e., 0x00000000 minus 3=0xFFFFFFFD). If the next thread was to be executed in 6 cycles, then the counter 200 would be assigned the hexadecimal number 0xFFFFFFFA (i.e., 0x00000000 minus 6=0xFFFFFFFA), and so on. In the above case, if the processor speed were 1Ghz, then 100 us would correspond to 100,000 cycles, and the performance counters would be loaded with 0xFFFE7960 so they would overflow 100,000 cycles later and generate an NMI which would cause the real-time scheduler to gain control and switch to the next thread.

If there are any internal real-time threads to be executed, the process next Creates them S3222. An example of an internal thread that might be used is a thread that monitors overhead for the real-time scheduler process. However, other system-wide threads could also be implemented if desired. Lastly, the performance counter 200 is started S324 and the system-setup process terminates S326.

Figure 4:
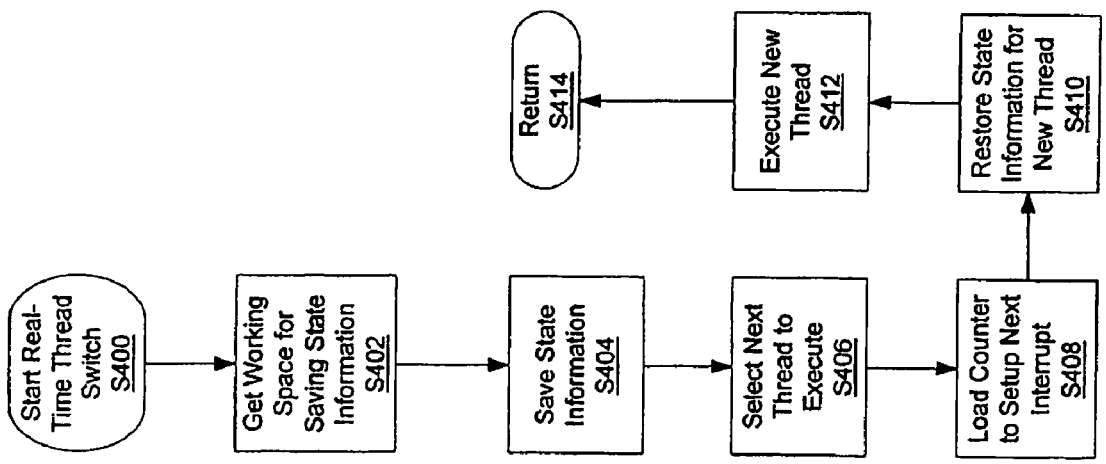
FIG. 4 is a flow chart depicting an exemplary process for switching execution from one real-time thread to another.

FIG. 4 depicts a flow chart of an exemplary process for switching execution from one real-time thread to another after the system-setup process has completed S326. The address in memory for the start-real-time-thread-switch code is stored in the IDT as described above. Whenever the counter 200 reaches zero, the counter issues an interrupt to the APIC 202. The APIC 202 routes the interrupt as either a MI or NMI to the CPU 204. The CPU 204 consults the IDT in order to determine the memory address for the MI or NMI, and thus starts execution of the start-real-time-thread-switch process S400.

On execution, the code saves as little as possible on the existing stack. This is to minimize the chances of causing a stack overflow. The code does not know if it has a valid data segment, so it saves EAX on the stack, and uses EAX to load a known valid and flat DS selector. After it has a valid data selector, the threadswitch code saves the original DS in a temporary storage location, then loads EAX with a pointer to the current threads state structures, and then uses those structures which were allocated during thread creation time to save all of the thread state except for EAX. The state information could include information regarding any one or more of the following: the processor state, the floating-point unit state, the stack and/or the counter 200. The state information is then saved in the working space S404, and the next thread (i.e., new thread) to be executed is selected S406. Of course, any scheduling algorithm could be used to select the next thread for execution. The counter 200 is next assigned a value to setup the next interrupt S408. The process restores the previously stored state information pertaining to the new thread to be executed S410. The CPU 204 is next setup to execute the new thread S412. The start-real-time-thread-switch process then returns control to the CPU 204 for execution of the new thread S414.

Figure 5:
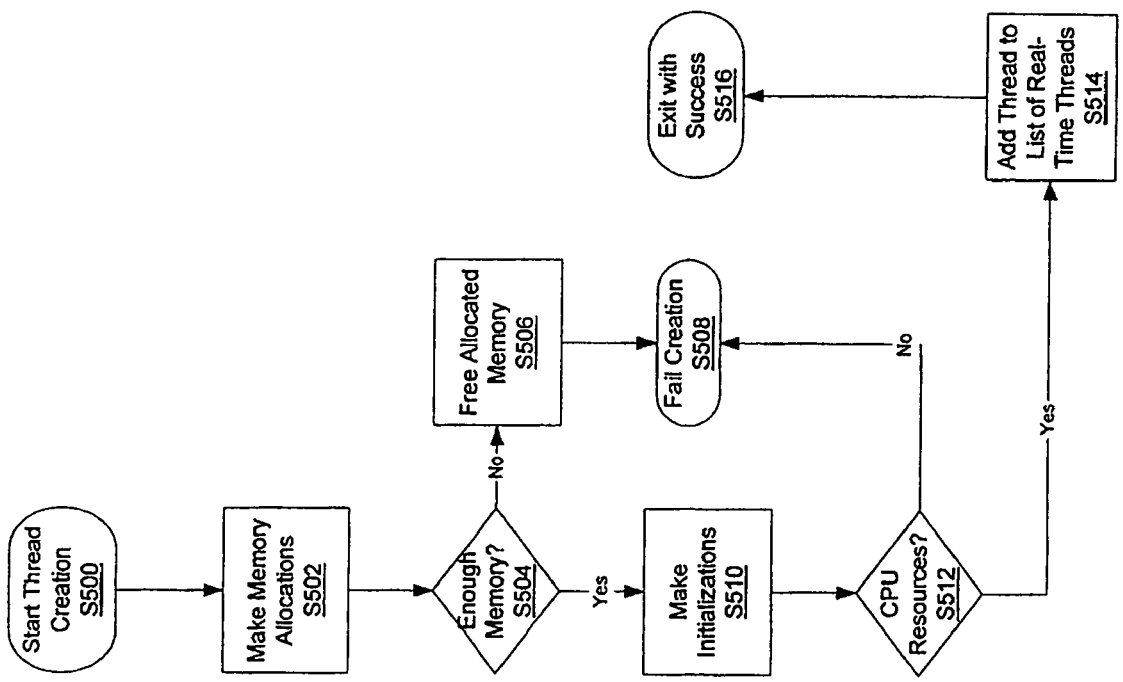
FIG. 5 is a flow chart showing an exemplary process of creating new real-time threads.

FIG. 5 illustrates a flow chart of an exemplary process of creating new real-time threads. Whenever a new real-time thread is to be created, such as in S316, a thread-creation process is called S500. The process first makes a locked memory (i.e., non-paged pool) allocation for all applicable space, such as: stack space, state space and floating point unit space S502. If the process was unable to allocate sufficient memory, then all allocated memory is freed S506 and the thread-creation process is failed S508.

However, if the process is able to allocate sufficient memory for the applicable space, the process makes all applicable initializations S510 including, but not limited to one or more of the following: the stack, the processor state, and the floating point state. If sufficient CPU resources are not available to service the real-time thread, then the thread-creation process is also preferably failed S508. Otherwise, if sufficient CPU resources are available to service the real-time thread S512, then the available CPU resources is updated to include the newly created thread's reservation, and then the thread is added to the list of real-time threads S514 and the thread-creation process exits with success S516. Note that the real-time scheduler maintains a variable that tracks the total amount of CPU that has been allocated to real-time threads. It uses this to prevent the CPU from being over allocated. If a create real-time thread call were to put the allocated CPU bandwidth above 100%, then the create call is failed. In this way, once a thread has been created, the bandwidth allocated to it is reserved for its own use. At startup time, the initialization code allocates 133 MHz of CPU bandwidth to the Windows real-time thread. This ensures that Windows always gets some percentage of CPU bandwidth. No matter how many real-time threads are running on a processor, Windows will never get less CPU than it would have on a 133 MHz system. Note that the amount of CPU allocated to Windows was selected based on the CPUs available at the time Windows Millennium (ME) shipped—and was targeted for the 9x platform. With CPUs being much faster now, and current Windows code running slower, it would be prudent to modify the amount of CPU allocated to the operating system to ensure good performance. It is very easy to change how much CPU windows is allocated, and the number should be determined based on how fast the processors are, as well as the processing requirements of the operating system. In the implementation shipped on Windows ME, we allowed real-time threads to allocate up to X %=(processor speed in MHz—133)/processor speed in MHz of the CPU. 87.7% in the case of a 1 GHz processor for example.

It should also be noted that when a real-time thread terminates before expiration of its CPU resources, or whenever it has completed its work for the current period, and thus, potentially before issuance of the applicable MIs or NMIs, the real-time thread should preferably yield the balance of its CPU resources. This is preferably accomplished by calling the RtYield api which will transfer control to the real-time scheduler by writing a command directly in the command register for the APIC 202 that instructs the APIC 202 to issue an MI or NMI (i.e., a hardware interrupt) to the CPU 204. Alternatively, this could be accomplished by assigning a new hexadecimal value to the counter 200. For example, assigning a value of 0xFFFFFFFF would trigger a thread switch in one cycle or, assigning a value of 0x00000000 might trigger an immediate switch by causing the counter 200 and APIC 202 to each issue an MI or NMI. However, this approach overwrites the value in the performance counter 200. Still another approach would be to issue a software MI or NMI to the CPU. However, the timing on software interrupts is different from hardware interrupts. Further, since this MI or NMI would be a software interrupt, a different hardware MI or NMI could interrupt the ISR. Note that the current embodiment of the invention uses a software interrupt to transfer control to the real time scheduler as it is faster than writing to the local apic hardware.

As discussed above with respect to FIGS. 3-5, the present invention enables a non-real-time operating system to perform real-time scheduling of CPU resources. Again, this is accomplished by treating the operating system as a real-time thread. The invention then executes each real-time thread running on the CPU for its corresponding portion of the time slot. When the portion of time corresponding to one thread expires, the next real-time thread is executed until its portion of time expires. Every time slot is split into varying length slices of time—each of which correspond to the percentage of CPU reserved for that thread. Note that the real-time thread used by the operating system gets all the cycles not used by the other real-time threads. That is, a thread may Yield execution before it has used all of its reservation. In that case, the windows real-time thread will pick up the execution time yielded. Note that using variable sized slices of time is also very different from how most traditional schedulers work—they almost invariably use a fixed time slice, and simply choose which thread should get the next fixed size time slice.

Figure 6:
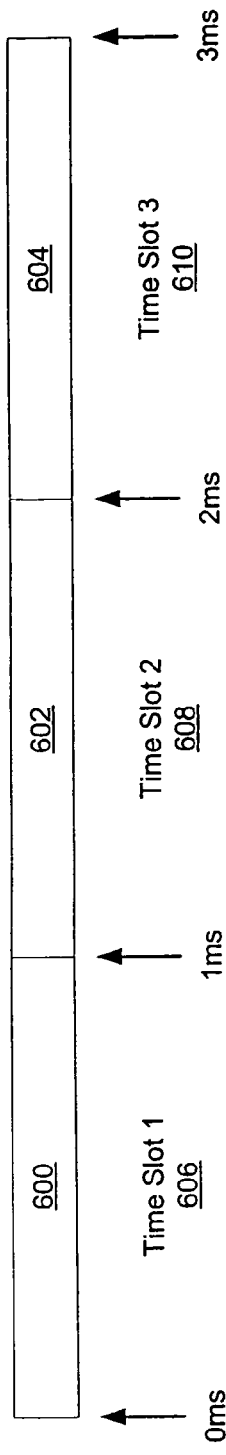
FIG. 6 depicts time slots during which a CPU can execute instructions.
Figure 7:
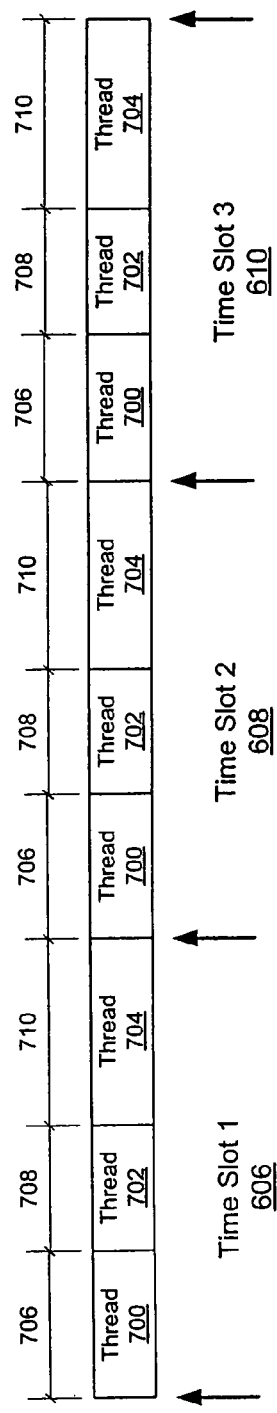
FIG. 7 depicts time slots during which CPU resources are allocated to a plurality of threads.
Figure 8:
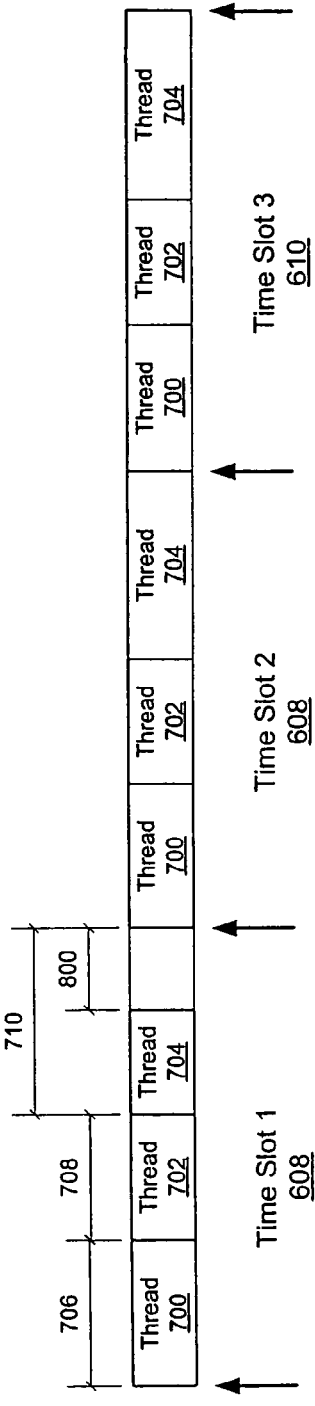
FIG. 8 depicts time slots during which CPU resources are allocated to a plurality of threads and where one of the threads does not use its entire allocated portion of the time slot because it is blocked on a synchronization object. (ie: a spinlock).

This is illustrated in FIGS. 6-8. In FIG. 6, three time slots 600, 602, 604 are depicted. Again, each time slot is a periodic amount of time during which a CPU can execute instructions. The time slot can be any amount of time such as, for example, 1 ms, which is shown in FIGS. 6-8. Skilled artisans will appreciate that the time slot can be defined or otherwise set up in a variety of ways. Preferably, the present invention defines the time slot to be a predetermined period of time (e.g., 1 ms).

In FIG. 7, the CPU is executing three threads 700, 702, 704 in each time slot 600, 602, 604. In particular, thread 700 runs until its portion 706 of the time slot expires. The method of FIG. 4 is then used to switch execution to thread 702, which then runs until its portion 708 of the time slot expires. Similarly, the method of FIG. 4 is then used to switch execution to the next real-time thread, thread 704, which then runs until its portion 710 of the time slot expires. By using this approach to schedule CPU resources, the present invention guarantees each real-time thread that it will be allocated CPU resources for at least a portion of each time slot.

Skilled artisans will understand that the portion of the time slot allocated to any given real-time thread could be determined by many different methods. Preferably, the process corresponding to the real-time thread will request that it be allocated a certain portion of the time slot or a certain percentage of CPU resources periodically. Alternatively, processes may not have an understanding as to how much CPU resources they need or what portion of the time slot they will require. Consequently, the portion of the time slot to be allocated can be dynamically determined based on historical use of the CPU resources by the real-time thread.

This could be implemented by allowing the process/thread to identify a probability of missing a deadline. For example, the thread could declare to the present invention that it does not know the amount of CPU resources that it will require, but that it can tolerate a x % probability of missing a deadline. So, if the thread declares that it can tolerate missing one deadline every thousand periods (i.e., 1/1000), then present invention could assign a portion of the time slot (i.e., period) to the thread. If the thread misses its deadline more than once every thousand periods, then the present invention could increase the thread's portion of the time slot. Similarly, if the portion of the time slot could be decreased if the rate of missing deadlines is smaller than the declared tolerance value.

Figure 9:
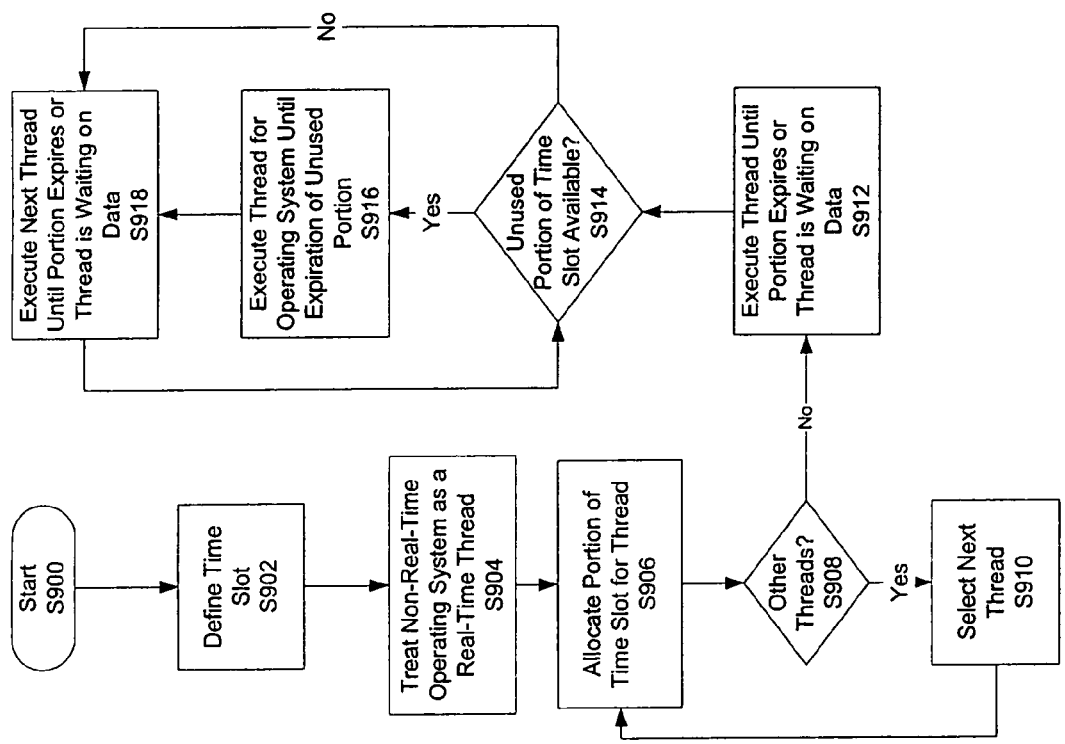
FIG. 9 is a flow chart that illustrates an exemplary method of guaranteeing CPU resources in a non-real-time operating-system environment.

FIG. 9 generally illustrates the above-referenced method of guaranteeing CPU resources in a non-real-time operating-system environment. After starting S900 the invention, the periodic time slot 600, 602, 604 during which real-time threads will guaranteed CPU resources is defined S902. The non-real-time operating system is then treated as a real-time thread S904. Consequently, a portion of the time slot is allocated to the real-time thread for the non-real-time operating system S906. If there are other real-time threads that require CPU resources S908, then the next thread is selected S910 and portions of the time slot are allocated for those threads as well S906. Otherwise, a real-time thread (e.g., thread 704) is executed until its portion expires or the thread is waiting on a synchronization object and therefore cannot proceed S912.

If thread 704 is waiting on data synchronization object S914, then the remaining unused portion of the time slot is preferably utilized by another thread S918. This is depicted in FIG. 8, where thread 704 does not use its allocated portion 710 of the time slot 606 because it is waiting on a synchronization object and therefore yields the unused remaining portion 800 of the time slot 606. The present invention can then allocate this remaining portion 800 to another thread such as, for example, the thread for the operating system, which is then executed until expiration of the remaining portion 800 of the time slot S916. This enables the CPU resources to be in constant use whenever there is a thread to be executed—as opposed to allowing the CPU sit idle when there is work to be performed. If, as shown in FIG. 7, the thread (e.g., 704) is not waiting on a synchronization object and instead the thread (e.g., 704) used the entirety of its allocated portion S914, then the next thread (e.g., 700) is similarly executed until expiration of its portion of the time slot or until the thread (e.g., 700) blocks on a synchronization object S918.

Thus, if a non-real-time operating system is treated as a real-time thread such as, for example, thread 700, then the present invention will enable the non-real-time operating system to perform real-time scheduling of CPU resources. Further, the present invention will guarantee allocation of CPU resources in every time slot to real-time threads. The only exception to this, of course, is when a real-time thread is blocked on a synchronization object, in which case its portion or unused portion of the time slot will be utilized by another thread.

The current invention uses 2 different interrupt sources to drive the real-time scheduler. A maskable interrupt that is generated by the local APIC timer, and which has a period that defines the length of the time-slot. Currently that period is set to 1 ms but clearly that can be modified as required. At the start of every timeslot the local APIC timer interrupt fires and takes control away from windows—and disables interrupts in the process. The real-time scheduler then switches control to the first real-time thread, and loads the performance counters with a value that will cause an interrupt to fire the appropriate fraction of a time-slot later. The performance counter interrupt is unmasked, and it is programmed to fire a non maskable interrupt. Control is then transferred to the real-time thread, and is regained when the performance counter NMI fires. The real time scheduler then selects the next real-time thread to run if any, and programs the performance counters to fire at the appropriate fraction of a time-slot for that thread, and again transfers control to the second real-time thread. This continues until all real-time threads have been run, at which time, the performance counter interrupts are masked, and the local APIC timer interrupt is unmasked, and control is transferred to windows, at which time, interrupts are reenabled, since they had to be enabled for us to get control in the first place. In this way, interrupts stay disabled the whole time we are switching between multiple real-time threads, during the fraction of a millisecond that they have each allocated. When they have all run, control goes back to windows which gets whatever time is remaining in that time-slot—when it will lose control again to the next local APIC timer interrupt.

Figure 10:
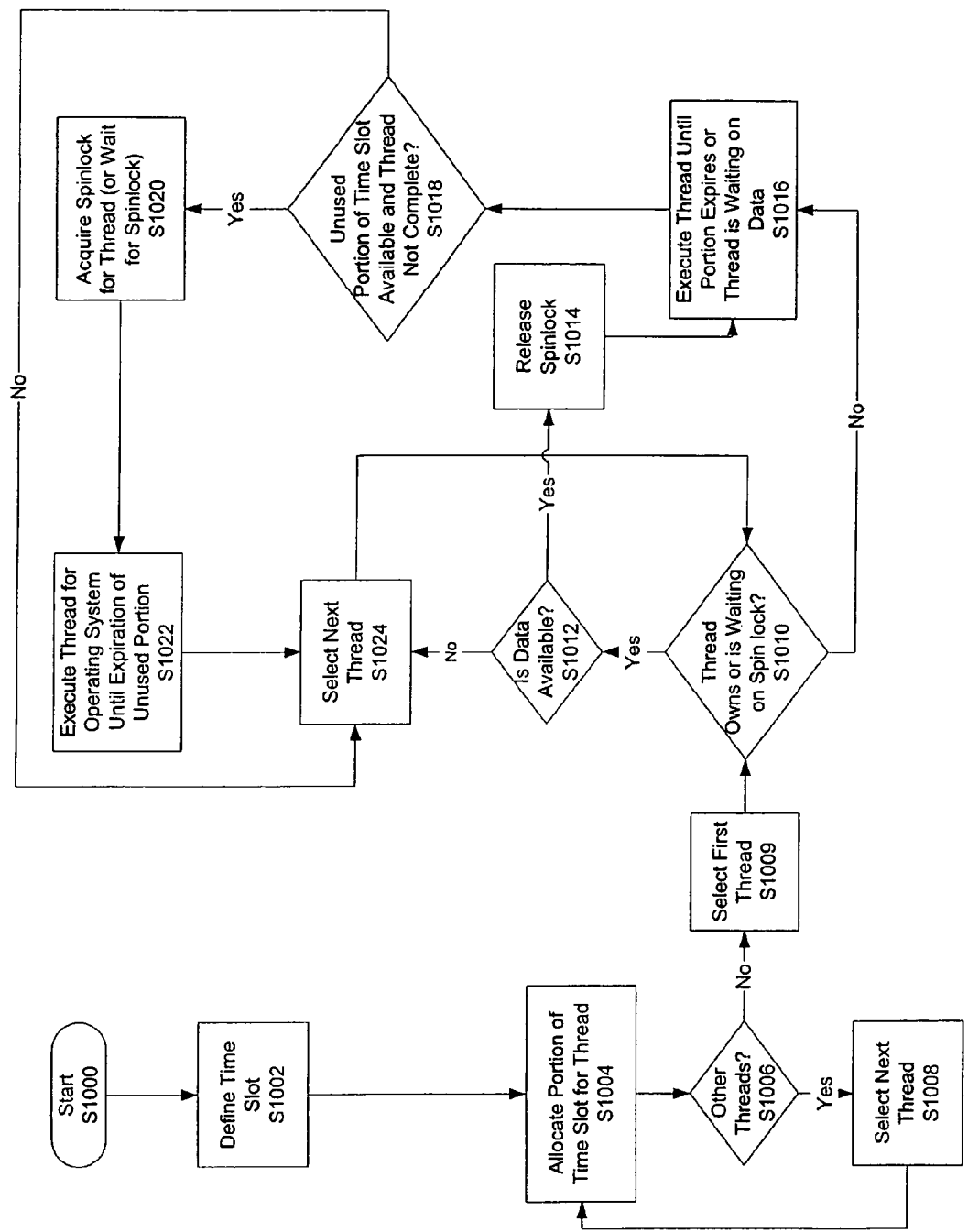
FIG. 10 is a flow chart illustrating an exemplary method by which a machine can schedule CPU resources such that real-time threads can synchronize with each other and since the Windows OS is treated as a single real-time thread—they can also synchronize with non real-time Windows driver code. Note that the current embodiment was implemented for uni-processor machines. The design can be extended to multi-processor machines as well.

Another benefit of the present invention is that it enables synchronization between real-time threads, and between real-time and non real-time Windows threads through the support of Windows synchronization objects. The synchronization objects currently supported are spinlocks. This is shown in FIG. 10. After starting S1000, a time slot for which said CPU resources are to be allocated is defined S1002. Portions of the time slot are allocated for each real-time thread S1004, S1006, S1008. The first thread to be executed is selected S1009.

The present invention then determines whether the thread owns (or is waiting for) a spinlock S1010, which is used in order to determine whether a given thread is blocked or runnable. The thread is waiting on data and the data is available S1012, then the spinlock is released S1014 and the thread is executed until its portion of the time-slot expires or it again tries to acquire an already held spinlock S1016. If the spinlock was not available S1012, the thread continues to wait and the next thread is selected S1024, after which the process repeats.

After execution of the thread until its portion expires or the thread is waiting on data S1016, the present invention determines whether the thread used its portion of the time slot S1018. If not, or if the thread has terminated, then the next thread is selected S1024. However, if the thread did not use its entire portion of the time slot and the thread has not terminated, then the thread is waiting on data before it can proceed. Consequently, the thread acquires a spinlock, or if the spinlock is already owned, the thread waits on the spinlock S1020. The thread for the operating system (or another thread) is then executed until expiration of the unused portion of the time slot S1022, after which the next thread is then selected S1024.

Commented source code illustrative of how to implement the synchronization of real-time threads is attached in sections of the Appendix that are labeled spinlock.c, rtinfo.h and rt.h. Also included is the core thread switching code that runs whenever threads are switched.

In sum, the present invention overcomes the limitations and problems of the prior art by preferably using a performance counter to count unhalted cycles or instructions executed on the CPU. After a determined number of cycles or instructions transpire, the performance counter issues a maskable or non-maskable interrupt (i.e., a MI or NMI) to a programmable interrupt controller (PIC), such as an APIC on an Intel x86 CPU or an OpenPIC on a Cyrix or AMD CPU. Issuance of the interrupt triggers execution of the scheduler, and thus, switches thread execution on a real-time basis. In addition, the disclosed methods and computer-executable components overcome the limitations of the prior art by: (a) scheduling CPU resources such that real-time threads are guaranteed respective portions of time slots, (b) providing real-time scheduling on a non-real-time operating system, and (c) allowing synchronization between real-time threads as well as non real-time threads through the support of Windows synchronization objects. (Such as spinlocks.).

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

I claim:

1. For a CPU running a non-real-time operating system, a method of scheduling CPU resources comprising:
   a) defining a time slot for which a first real-time thread will be guaranteed said CPU resources for at least a first portion of said time slot, wherein the timeslot is defined by an APIC which issues a non-maskable interrupt every 1 ms;
   b) treating the non-real-time operating system as a second real-time thread;
   c) allocating, to the second real-time thread, a second portion of the time slot during which the second real-time thread will be guaranteed said CPU resources;
   d) executing the first real-time thread during said first portion of the time slot; and
   e) executing the second real-time thread during said second portion of the time slot;
   f) allocating, to one or more other real-time threads, respective one or more other portions of said time slot for which said one or more other real-time threads are guaranteed said CPU resources; and
   g) executing said one or more other real-time threads for their said respective one or more other portions of said time slot.

2. The method of claim 1 further comprising: executing the second real-time thread during an unallocated portion of the time slot, whenever at least one portion of the time slot is not allocated.

3. The method of claim 1 further comprising: allowing at least one of said real-time threads to request a portion of said time slot for which said at least one of said real-time threads will be guaranteed said CPU resources.

4. The method of claim 1 wherein a performance counter issues a performance-counter interrupt in order to switch allocation of said CPU resources between said real-time threads.

5. The method of claim 1 wherein the time slot is split into varying length slices of time.

6. The method of claim 5 wherein the varying length slices of time correspond to the percentage of CPU resources reserved for each of the real time threads.

7. A method of scheduling CPU resources comprising:
   a. defining a repeating time slot for which said CPU resources are allocated;
   b. assigning a first portion of said time slot to a first real time thread corresponding to a non-real time operating system, thereby guaranteeing a minimum percentage of said CPU resources to said operating system;
   c. assigning a second portion of said time slot to a second real time thread;
   d. executing said real time threads during their assigned portions of said time slot;
   e. reassigning a remaining portion of said second portion to said first real time thread when said second real time thread concludes; and
   f. reassigning at least one portion of the time slot based at least in part on a missed deadline tolerance of a thread.

8. The method of claim 7, wherein the time slot is defined by an APIC, which issues an interrupt.

9. The method of claim 8 wherein the APIC issues an APIC interrupt every 1 ms.

10. The method of claim 7 wherein a performance counter issues a performance-counter interrupt in order to switch allocation of said CPU resources between said real-time threads.

11. A method of scheduling CPU resources on a uni-processor machine such that at least first and second real-time threads dependent on one another are synchronized, the method comprising:

a. defining a repeating time slot for which said CPU resources are allocated;
b. determining a first portion of said time slot for which CPU resources should be allocated to said first real-time thread;
c. determining a second portion of said time slot for which CPU resources should be allocated to said second real-time thread, wherein said second real-time thread is an operating system thread; and
d. during said first portion of said time slot, executing the first real-time thread until the first real-time thread needs data locked by a spinlock owned by a different thread, and reassigning a remainder of said first portion of said time slot to said operating system thread.

12. The method of claim 11 further comprising one or more other real-time threads being executed by the uni-processor machine during respective one or more other portions of said time slot.

13. The method of claim 12 wherein the time slot is defined by an APIC, which issues an interrupt.

14. The method of claim 13 wherein the APIC issues an APIC interrupt every 1 ms.

15. The method of claim 14 wherein the APIC interrupt is non-maskable.

16. The method of claim 15 wherein a performance counter issues a performance-counter interrupt in order to switch allocation of said CPU resources between the first and second real-time threads.

17. The method of claim 16 wherein the performance-counter interrupt is non-maskable.

18. The method of claim 11 wherein the remainder of said first portion of said time slot to said operating system thread is reassigned immediately in response to the first real-time thread needing data locked by a spinlock owned by a different thread.

* * * * *